US010816496B2

(12) United States Patent
Abdelrahman et al.

(10) Patent No.: US 10,816,496 B2
(45) Date of Patent: Oct. 27, 2020

(54) DIFFERENTIAL SAND COMPACTION SENSOR

(71) Applicant: TENNESSEE TECHNOLOGICAL UNIVERSITY, Cookeville, TN (US)

(72) Inventors: Mohamed Abdelrahman, Pueblo, CO (US); Michael Baswell, Cookeville, TN (US); Kenneth Currie, Morgantown, WV (US)

(73) Assignee: Tennessee Technological University, Cookeville, TN (US)

( * ) Notice: Subject to any disclaimer, the term of this patent is extended or adjusted under 35 U.S.C. 154(b) by 0 days.

(21) Appl. No.: 14/547,114

(22) Filed: Nov. 18, 2014

(65) Prior Publication Data

US 2017/0052137 A1 Feb. 23, 2017

Related U.S. Application Data

(63) Continuation of application No. 13/204,677, filed on Aug. 6, 2011, now Pat. No. 8,890,549.

(60) Provisional application No. 61/371,240, filed on Aug. 6, 2010.

(51) Int. Cl.
*G01N 27/22* (2006.01)

(52) U.S. Cl.
CPC ............... *G01N 27/221* (2013.01)

(58) Field of Classification Search
CPC ........ G01R 35/00; G01R 27/26; G01R 27/22; G01R 27/02; G01R 27/2605
USPC .......................................... 324/672
See application file for complete search history.

(56) References Cited

U.S. PATENT DOCUMENTS

| | | | | | |
|---|---|---|---|---|---|
| 2,104,709 | A | * | 1/1938 | Weinig ............... | B02C 19/00 241/20 |
| 2,392,568 | A | * | 1/1946 | Bair ................. | C03B 19/06 65/66 |
| 3,620,293 | A | * | 11/1971 | Kruse ............... | B22C 15/12 164/155.5 |
| 3,924,463 | A | * | 12/1975 | Urbanosky .......... | E21B 49/10 73/152.25 |
| 3,934,455 | A | * | 1/1976 | Harrisberger ....... | G01N 15/082 436/5 |
| 4,230,359 | A | * | 10/1980 | Smith .............. | B65F 3/04 296/101 |
| 4,804,032 | A | * | 2/1989 | Wilkins ............ | B22C 9/046 164/119 |
| 5,332,025 | A | * | 7/1994 | Larsen ............. | B22C 11/10 164/154.1 |
| 5,618,484 | A | * | 4/1997 | Mogensen ......... | B22C 15/02 164/154.1 |

(Continued)

*Primary Examiner* — Christopher P McAndrew
(74) *Attorney, Agent, or Firm* — Andre J. Bahou; Blake M. Bernard; Waller Lansden Dortch & Davis LLP

(57) ABSTRACT

A device for monitoring the effectiveness of sand compaction on a production line comprising one or more sensors. The sensor's response measures the changes in sand compaction, which is affected by the mechanics of the vibration system, changes in the sand properties, and environmental changes. A sensor comprises multiple chambers where the sand is compacted, with each of these chambers having a different difficulty in resisting sand filling and compaction. The difficulty of filling and compacting the sand in these chambers can be controlled using factors such as geometry of each of the chambers and direction of the fill and compaction of sand.

8 Claims, 1 Drawing Sheet

A Schematic of Online Differential Sand Compaction Sensor

(56) References Cited

U.S. PATENT DOCUMENTS

| | | | | |
|---|---|---|---|---|
| 5,756,907 | A * | 5/1998 | Senda | G01N 3/08 73/866 |
| 6,161,422 | A * | 12/2000 | Thomas | G01N 3/08 324/640 |
| 7,036,558 | B2 * | 5/2006 | Faraldi | B22C 19/04 164/150.1 |
| 7,221,165 | B2 * | 5/2007 | Fleury | G01N 27/02 324/376 |
| 2004/0000388 | A1 * | 1/2004 | Faraldi | B22C 19/04 164/456 |
| 2005/0104596 | A1 * | 5/2005 | Fleury | G01N 27/02 324/376 |
| 2005/0178522 | A1 * | 8/2005 | Kurokawa | B22C 1/18 164/522 |
| 2006/0231232 | A1 * | 10/2006 | Faraldi | B22C 19/04 164/456 |
| 2010/0148389 | A1 * | 6/2010 | Akedo | C23C 24/04 264/115 |
| 2012/0074964 | A1 | 3/2012 | Abdelrahman et al. | |
| 2012/0199306 | A1 * | 8/2012 | Hadano | B22C 15/02 164/15 |
| 2013/0100444 | A1 * | 4/2013 | Chesner | G01J 3/443 356/318 |

* cited by examiner

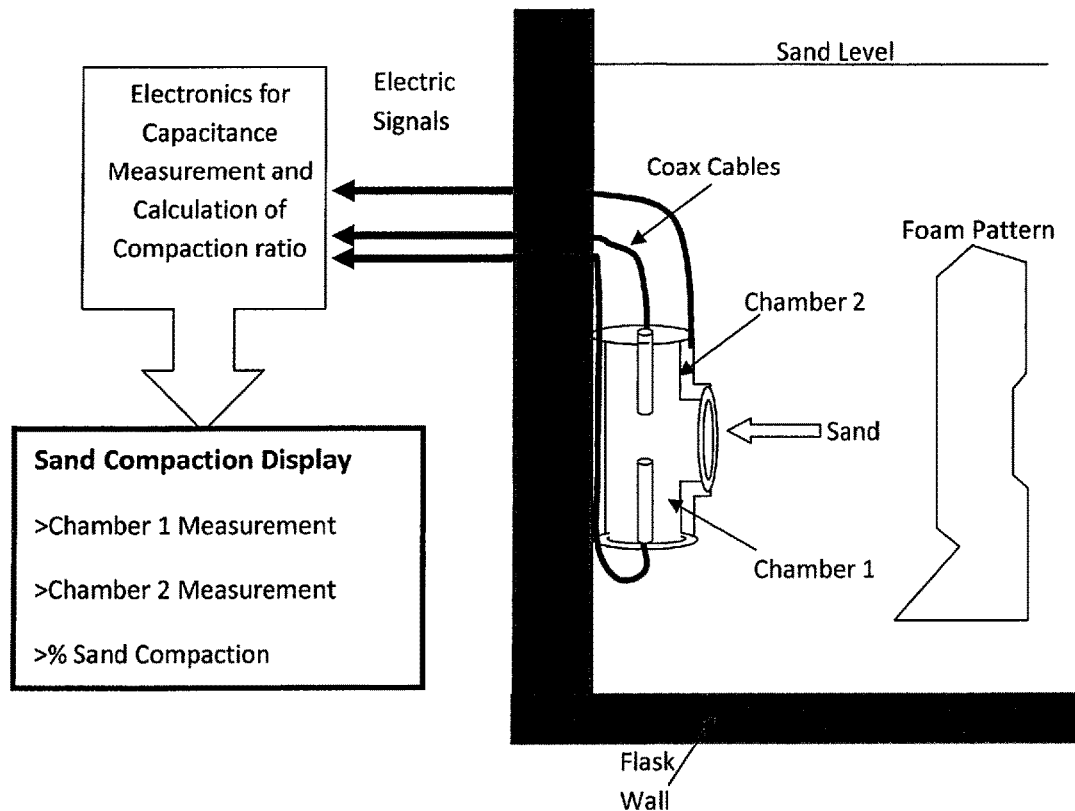
Figure 1: A Schematic of Online Differential Sand Compaction Sensor
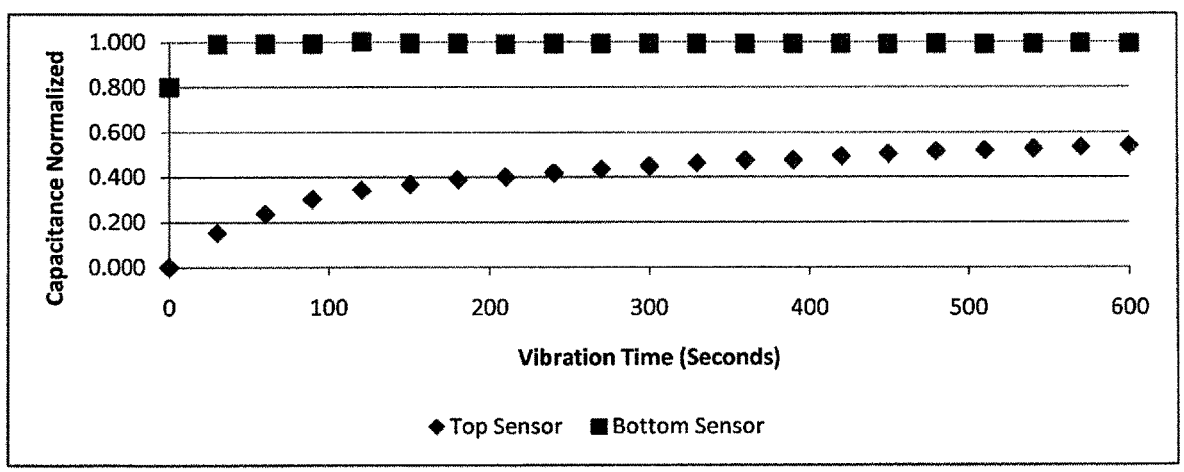
Figure 2: Experimental Data Showing Normalized Response of the Top and Bottom Sensors versus Vibration Time Corresponding to the Compaction Chambers in Shown in Figure 1

DIFFERENTIAL SAND COMPACTION SENSOR

This application is a continuation of U.S. patent application Ser. No. 13/204,677, filed Aug. 6, 2011, which claims priority to Provisional Patent Application No. 61/371,240, filed Aug. 6, 2010, entitled "DIFFERENTIAL SAND COMPACTION SENSOR," and is entitled to that filing date for priority. The complete disclosure, specification, drawings and attachments of patent application Ser. No. 13/204,677 and Provisional Patent Application No. 61/371,240 are incorporated herein in their entireties by reference for all purposes.

FIELD OF INVENTION

This invention relates to a sensor and method for analyzing and monitoring the effectiveness of sand compaction on a production line.

BACKGROUND

As the cost of energy rises and competition for higher quality casting of greensand molds increases, the ability to reduce scrap rates and the identification of process irregularities and problems which affect quality of the casting become increasing important.

Greensand characteristics are normally measured from the muller, and are limited to information on the greensand at that time. From the muller, the greensand travels along conveyors, down hoppers, and through nozzles into the mold chambers. Any of these processes can affect the resulting mold properties. In addition, after the greensand mold is made, it is moved to the pour station, and during this movement, the mold may develop cracks or may even collapse. Problems with a mold usually cannot be detected by visual inspection.

SUMMARY OF INVENTION

In various exemplary embodiments, the present invention comprises one or more sensors used to monitor the effectiveness of sand compaction on a production line (i.e., "online"). The sensor's response measures the changes in sand compaction, which is affected by the mechanics of the vibration system such as motor and linkage wear, changes in the sand properties such as fine content and loss on ignition percentage, and environmental changes such as temperature and humidity.

In one embodiment, a sensor comprises multiple chambers where the sand is compacted, with each of these chambers having a different difficulty in resisting sand filling and compaction. The difficulty of filling and compacting the sand in these chambers can be controlled using factors such as geometry of each of the chambers and direction of the fill and compaction of sand.

In one embodiment, the sensor comprises two chambers. The first is oriented such that sand flows with gravity, while in the second chamber the sand would have to flow against gravity. This arrangement allows for sand to fill the bottom chamber to an ideal compaction under modest compaction recipes, while the filling of the top chamber would fill according to the effectiveness of the compaction recipe.

Each of the chambers may be equipped with a sensor to measure the degree of sand fill and compaction. In one embodiment, a capacitive sensor is used to measure the degree of sand fill and compaction. The capacitive sensor electrodes are comprised of two electrodes. The first of said electrodes is an internal cylindrical probe and the second is the chamber inside body. Changes in the dielectric properties of the sensor by the introduction of the sand into the chamber are reflected in an increase in the capacitances of said chambers.

An electronic means for measuring an electric voltage signal that is proportional to the capacitance of each sensor, and hence the sand fill in each compaction chamber, is provided. In the electronic circuit used in one particular embodiment, the impedance from the capacitance in each chamber forms a potential divider with a capacitance of known value. An AC signal of high frequency is injected and the voltage signal across the potential divider is amplified and rectified to produce a voltage signal that is proportional to the capacitance of the compaction chamber.

A microcontroller or microprocessor (such as in a computing device) is used to acquire the voltage signal and display the voltage signal corresponding to each chamber. The microcontroller or microprocessor is also used to implement an algorithm based on the differential measurements of the compaction in each of said compaction chambers. One of the simplest algorithms that can be implemented to monitor compaction effectiveness is to obtain the ratio of changes in compaction of the upper and lower chambers. This ratio will always be less than or equal to unity and a higher ratio shows a more effective compaction. Changes due to the properties of the sand are reduced by using the ratio of the capacitance measurement from the two chambers, where the dielectric constant of the sand in the two chambers is almost identical. The design of the lower chamber to fill and compact easily makes sure that this chamber provides an indicator of best possible compaction, under a given set of conditions, to use as a reference.

BRIEF DESCRIPTION OF THE DRAWINGS

FIG. 1 shows a view of a sensor and its environment in accordance with an embodiment of the present invention.

FIG. 2 shows experimental data from the sensor of FIG. 1.

DETAILED DESCRIPTION OF EXEMPLARY EMBODIMENTS

In one exemplary embodiment, the present invention comprises one or more sensors used to monitor the effectiveness of sand compaction on a production line (i.e., "online"). The sensor's response measures the changes in sand compaction, which is affected by the mechanics of the vibration system such as motor and linkage wear, changes in the sand properties such as fine content and loss on ignition percentage, and environmental changes such as temperature and humidity.

In one embodiment, a sensor comprises multiple chambers where the sand is compacted, with each of these chambers having a different difficulty in resisting sand filling and compaction. The difficulty of filling and compacting the sand in these chambers can be controlled using factors such as geometry of each of the chambers and direction of the fill and compaction of sand. In the embodiment shown in FIG. 1, the sensor is comprised of two chambers. The first is oriented such that sand flows with gravity, while in the second chamber the sand would have to flow against gravity. This arrangement allows for sand to fill the bottom chamber to an ideal compaction under modest compaction recipes, while the filling of the top chamber would fill according to the effectiveness of the compaction recipe.

Each of the chambers is equipped with a sensor to measure the degree of sand fill and compaction. In the embodiment shown in FIG. 1, a capacitive sensor is used to measure the degree of sand fill and compaction. The capacitive sensor electrodes are comprised of two electrodes. The first of said electrodes is an internal cylindrical probe and the second is the chamber inside body. Changes in the dielectric properties of the sensor by the introduction of the sand into the chamber are reflected in an increase in the capacitances of said chambers.

An electronic means for measuring an electric voltage signal that is proportional to the capacitance of each sensor, and hence the sand fill in each compaction chamber, is provided. In the electronic circuit used in the particular embodiment shown, the impedance from the capacitance in each chamber forms a potential divider with a capacitance of known value. An AC signal of high frequency is injected and the voltage signal across the potential divider is amplified and rectified to produce a voltage signal that is proportional to the capacitance of the compaction chamber.

A microcontroller or microprocessor (such as in a computing device) is used to acquire the voltage signal and display the voltage signal corresponding to each chamber. The microcontroller or microprocessor is also used to implement an algorithm based on the differential measurements of the compaction in each of said compaction chambers. In the embodiment shown in FIG. 1, one of the simplest algorithms that can be implemented to monitor compaction effectiveness is to obtain the ratio of changes in compaction of the upper and lower chambers. This ratio will always be less than or equal to unity and a higher ratio shows a more effective compaction. Changes due to the properties of the sand are reduced by using the ratio of the capacitance measurement from the two chambers, where the dielectric constant of the sand in the two chambers is almost identical. The design of the lower chamber to fill and compact easily makes sure that this chamber provides an indicator of best possible compaction, under a given set of conditions, to use as a reference.

It should be noted that the differential nature of the sensor's measurement is intended to reduce the deviation in sensor evaluation of compaction effectiveness due to environmental factors. Consider for example that the sand dielectric properties change due to moisture content by an increase of 10%. This would lead to an increase of 10% in each of the two chambers shown in FIG. 1. If the compaction is evaluated based on the ratio of the capacitance measurement of each chamber, the ratio would be independent of that change. Assuming that the compaction in the bottom chamber in FIG. 1 will always be ideal, the ratio of the compaction in the top chamber to that of the bottom one will be a measure of closeness to ideal compaction.

This differential compaction sensor can achieve the following:

a. monitor the repeatability of the filling process;

b. measure the effectiveness of a compaction recipe versus another; and c. measure the effective compaction time, i.e., time after which sand stops compacting.

The normalized response from a sensor embodiment similar to that shown in FIG. 1 is shown in FIG. 2. It shows the response from the bottom chamber and top chamber sensors. It is clear how the sensor corresponding to the bottom chamber saturates quickly to its maximum response while the sensor corresponding to the top chamber continues to slowly rise as the compaction continues. The level of compaction achieved in the top chamber is representative of the effectiveness of the compaction recipe used.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. An apparatus for evaluating the effectiveness of sand compaction, comprising:
a sensor comprising two or more chambers adapted to receive sand from a single inlet, with an upper chamber located above the inlet and a lower chamber located below the inlet;
wherein the bottom chamber is configured to allow sand to fill the bottom chamber to a best possible compaction under gravity flow for a compaction recipe being tested, and the upper chamber is configured to allow sand to fill the upper chamber according to the effectiveness of the compaction recipe.

2. The apparatus of claim 1, each chamber having a different difficulty in resisting sand filling.

3. The apparatus of claim 1, wherein there are two chambers.

4. The apparatus of claim 3, wherein one chamber is oriented such that sand flows into the chamber with gravity, while the other chamber is oriented such that sand flows into the chamber against gravity.

5. The apparatus of claim 1, wherein each chamber comprises a capacitive sensor adapted to measure the degree of sand fill and compaction.

6. The apparatus of claim 5, wherein each capacitive sensor comprises two electrodes.

7. The apparatus of claim 5, further comprising a microcontroller or microprocessor adapted to acquire an electric voltage signal proportional to the capacitance of each capacitive sensor.

8. The apparatus of claim 7, wherein the microcontroller or microprocessor acquires electric voltage signals from two or more of the capacitive sensors, and determines the relative compaction in each corresponding chamber.

* * * * *